United States Patent
Ueda et al.

(10) Patent No.: US 7,824,812 B2
(45) Date of Patent: Nov. 2, 2010

(54) FUEL CELL SYSTEM

(75) Inventors: Hideyuki Ueda, Osaka (JP); Masahiro Takada, Osaka (JP)

(73) Assignee: Panasonic Corporation, Osaka (JP)

( * ) Notice: Subject to any disclaimer, the term of this patent is extended or adjusted under 35 U.S.C. 154(b) by 817 days.

(21) Appl. No.: 11/808,162

(22) Filed: Jun. 7, 2007

(65) Prior Publication Data
US 2007/0287054 A1 Dec. 13, 2007

(30) Foreign Application Priority Data
Jun. 7, 2006 (JP) ............................ 2006-158737

(51) Int. Cl.
*H01M 8/06* (2006.01)
*H01M 8/04* (2006.01)

(52) U.S. Cl. .................. 429/410; 429/427; 429/447; 429/448

(58) Field of Classification Search ........... 429/410, 429/427, 447, 448; 73/200
See application file for complete search history.

(56) References Cited

FOREIGN PATENT DOCUMENTS

| JP | 2005-25959 | A | 1/2005 |
|---|---|---|---|
| JP | 2005-183014 | A | 7/2005 |
| JP | 2005-293974 | A | 10/2005 |
| JP | 2008-186800 | * | 8/2008 |

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

A fuel cell system includes a fuel cell including at least one unit cell having an anode, an anode-side flow channel for supplying a fuel to the anode, a cathode, and a cathode-side flow channel for supplying an oxidant to the cathode. The fuel cell system further includes a gas-liquid separator for catalytically purifying the effluent from the anode and the effluent from the cathode to collect liquid. The gas-liquid separator is connected to an anode-side discharge path for the effluent and a cathode-side discharge path for the effluent, which are in fluid communication with a fuel outlet of the anode-side flow channel and an oxidant outlet of the cathode-side flow channel, respectively.

7 Claims, 2 Drawing Sheets

FUEL CELL SYSTEM

FIELD OF THE INVENTION

The present invention relates to a fuel cell system, and, more particularly, to a gas-liquid separator included in the fuel cell system.

BACKGROUND OF THE INVENTION

Fuel cell systems include stationary ones such as cogeneration fuel cell systems and non-stationary ones for use in portable electronic devices, electric vehicles, etc. Non-stationary fuel cell systems have been proposed recently and direct-type fuel cells, in particular, are receiving attention as ubiquitous mobile power sources that do not need charging, for example, from an AC adapter. Currently, active research and development of direct-type fuel cells is underway.

In direct-oxidation-type fuel cells, a fuel is directly supplied to the anode. The oxidation reaction of the fuel occurs in the anode, while the reduction reaction of oxygen takes place in the cathode. In the case of direct methanol fuel cells using methanol as the fuel, the reaction formulas are as follows.

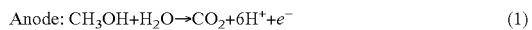

$$\text{Anode: } CH_3OH + H_2O \rightarrow CO_2 + 6H^+ + e^- \quad (1)$$

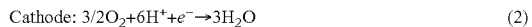

$$\text{Cathode: } 3/2 O_2 + 6H^+ + e^- \rightarrow 3H_2O \quad (2)$$

As shown by the formula (1), the anode reaction requires water. When water and a fuel are supplied from outside a fuel cell system, they are stored in a water cartridge and a fuel tank. Thus, additional space is necessary, thereby resulting in a decrease in energy density. It is therefore common in a direct methanol fuel cell to collect and reuse part of the water produced in the cathode (as shown by the formula (2)) in its fuel cell system.

Further, there has been proposed, for example, a circulation-type fuel cell system. In this fuel cell system, not only water but also anode and cathode effluents (which contain unreacted fuel, produced water, etc.) are collected, and the collected effluents are mixed with a high concentration fuel in a fuel tank. The resulting fuel mixture of a predetermined fuel concentration is reused to generate power.

Also, in order to reduce the size and weight of fuel cells and operate them longer, a fuel cell system of "fuel non-circulation (complete consumption)/water circulation (recovery) type" has been proposed (e.g., see Japanese Laid-Open Patent Publication No. 2005-25959 (Document 1)). The basic concept of such fuel cell systems is to bring the supply amount of a fuel of a predetermined concentration as close to the amount of the fuel consumed by power generation as possible, and collect/reuse water without reusing the fuel.

In the fuel cell system of Document 1, in order to prevent harmful substances from being discharged from the fuel cell system, unreacted fuel discharged from the anode is purified with a purifying device or transported to the cathode side, whereby the unreacted fuel is purified inside the power generation section of a fuel cell and purified with a purifying device disposed on the cathode outlet side. However, the catalytic purification inside the power generation section of the fuel cell causes a significant decrease in power generating characteristics.

Besides the above-mentioned proposals, various proposals have been made to prevent harmful substances from being discharged from fuel cell systems. For example, Japanese Laid-Open Patent Publication No. 2005-293974 (Document 2) proposes a fuel cell system of fuel circulation/water circulation type including a gas-liquid separating means and a harmful-substance collecting means (adsorbent such as activated carbon or zeolite), in order to efficiently collect harmful substances produced by power generation and prevent them from being discharged to outside.

Japanese Laid-Open Patent Publication No. 2005-183014 (Document 3) proposes a fuel cell system including a gas-liquid separator that selectively allows gas components in anode and cathode effluents to pass through, and a harmful-substance removal filter with a catalyst that oxidizes the passed gas components for combustion.

However, these related art documents merely propose means for preventing dispersion of harmful substances contained in gas components of effluents from fuel cells and means for purifying the harmful substances in the gas components. These related art documents do not have the concept of catalytically purifying all the effluents containing gas and liquid from the anode and cathode of a fuel cell and collecting water. That is, in related art, gas components discharged from fuel cells are catalytically purified and simply discarded to outside as steam, i.e., they are not effectively reused.

Further, in these related art documents, the liquid collected by the gas-liquid separator undesirably contains fuel. Thus, the fuel concentration in the liquid in the gas-liquid separator varies, thereby resulting in a decrease in power generation stability of the fuel cell system.

It is therefore an object of the present invention to effectively utilize effluents containing gas and liquid from the anode and cathode of a fuel cell and provide a fuel cell system with excellent power generation stability.

BRIEF SUMMARY OF THE INVENTION

In order to solve the problems as described above, the present invention provides a fuel cell system including: a fuel cell including at least one unit cell; a fuel supply path and an oxidant supply path; an anode-side discharge path and a cathode-side discharge path; and a gas-liquid separator. The unit cell includes an anode, an anode-side flow channel for supplying a fuel to the anode, a cathode, and a cathode-side flow channel for supplying an oxidant to the cathode.

The fuel supply path and the oxidant supply path are provided for supplying the fuel and the oxidant to the anode-side flow channel and the cathode-side flow channel, respectively.

The anode-side discharge path and the cathode-side discharge path are provided for discharging an effluent from the anode and an effluent from the cathode, respectively. The anode-side discharge path and the cathode-side discharge path are in fluid communication with a fuel outlet of the anode-side flow channel and an oxidant outlet of the cathode-side flow channel, respectively.

The gas-liquid separator is provided for catalytically purifying the effluent from the anode and the effluent from the cathode in order to collect liquid, and is connected to the anode-side discharge path and the cathode-side discharge path.

Preferably, the gas-liquid separator has a condenser for condensing the effluents and the condenser controls the concentration of the fuel contained in the liquid collected by the gas-liquid separator. More preferably, the concentration of the fuel contained in the liquid collected by the gas-liquid separator is controlled at 0.1 mol/L or less.

In the fuel cell system, the fuel and the liquid collected by the gas-liquid separator are preferably supplied to the anode-side flow channel.

Preferably, the fuel cell system of the present invention further includes a flow rate controller which controls the concentration of the fuel supplied to the anode by controlling the ratio of the flow rate of the fuel supplied to the anode-side flow channel per unit time to the flow rate of the liquid collected by the gas-liquid separator supplied to the anode-side flow channel per unit time.

In the fuel cell system, it is preferable that the condenser include an upper laminate and a lower laminate. The upper laminate includes a first catalyst layer, a first porous layer, and a gas-liquid separating membrane. The lower laminate includes a second porous layer and a second catalyst layer. The effluents from the anode and the cathode are passed through the upper laminate and the lower laminate in order to catalytically purify the effluents to collect liquid.

Further, in the fuel cell system of the present invention, the condenser preferably has a water absorber.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
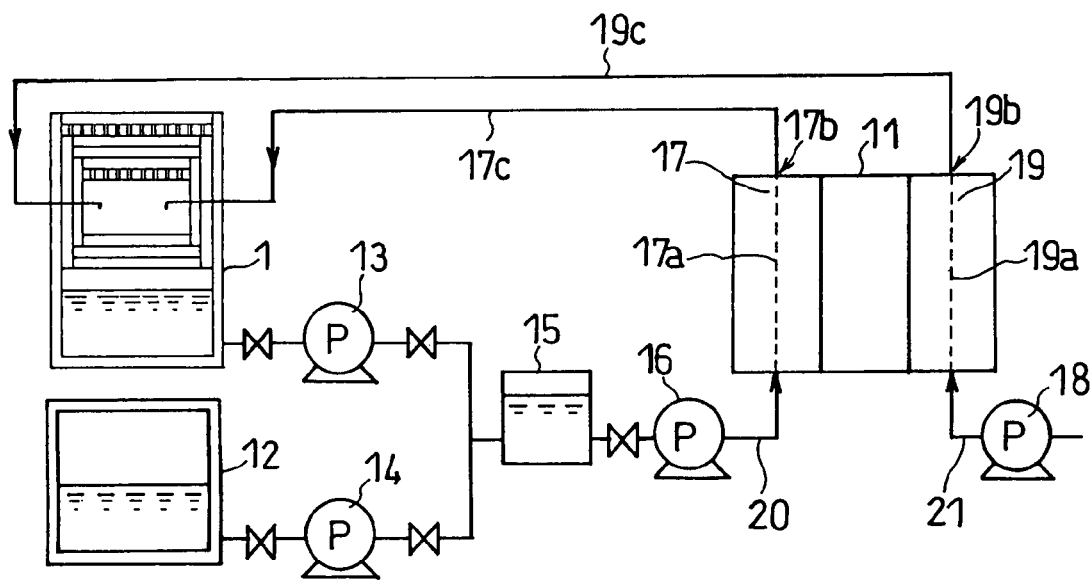
FIG. 1 is a schematic view of the structure of a fuel cell system according to one embodiment of the present invention.

Preferable embodiments of the present invention are hereinafter described with reference to drawings. In the following description, the same or equivalent element is given the same reference character, and an explanation thereof may be omitted to avoid repetition.

Figure 2:
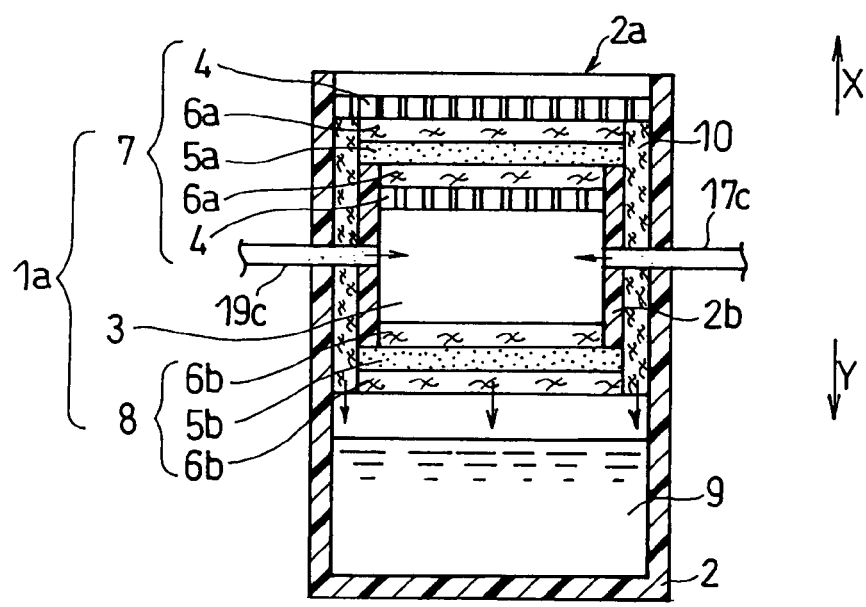
FIG. 2 is a schematic cross-sectional view of the structure of a gas-liquid separator included in the fuel cell system of FIG. 1.

FIG. 1 shows the structure of a fuel cell system according to one embodiment of the present invention, and FIG. 2 is a schematic cross-sectional view of the structure of a gas-liquid separator included in the fuel cell system of FIG. 1.

As illustrated in FIG. 1, the fuel cell system of this embodiment includes a fuel cell 11 and a gas-liquid separator 1. The fuel cell 11 includes an anode 17, an anode-side flow channel 17a for supplying a fuel to the anode 17, a cathode 19, and a cathode-side flow channel 19a for supplying an oxidant to the cathode 19. The gas-liquid separator 1 is connected to a fuel outlet 17b of the anode-side flow channel 17a and an oxidant outlet 19b of the cathode-side flow channel 19a, and catalytically purifies effluents from the anode 17 and the cathode 19 to collect liquid. Specifically, the gas-liquid separator 1 is connected to an anode-side discharge path 17c for discharging the effluent from the anode and a cathode-side discharge path 19c for discharging the effluent from the cathode. The anode-side discharge path 17c communicates with the fuel outlet 17b of the anode-side flow channel 17a, while the cathode-side discharge path 19c communicates with the oxidant outlet 19b of the cathode-side flow channel 19a.

In the fuel cell system of the present invention, unreacted fuel and reaction by-products contained in the effluents (gas and liquid components) from the anode 17 and the cathode 19 of the fuel cell 11 are catalytically purified, and water is collected. That is, a nature of the present invention lies in a new power generation system of fuel non-circulation (complete consumption)/water circulation (recovery) type, the basic concept of which is to collect/reuse water without reusing fuel.

Since the fuel cell system of the present invention is equipped with the gas-liquid separator, it is possible not only to catalytically purify unreacted fuel and reaction by-products contained in gas and liquid components discharged from the fuel cell but also to collect water as a result of the catalytic purification. It is thus possible to secure water necessary for power generation and prevent harmful substances from being released to outside. Also, since the catalytic purification is not performed inside the fuel cell, the power generating characteristics do not degrade. As used herein, "effluent" contains gas and liquid components discharged from the anode and cathode of the fuel cell, for example, unreacted fuel, reaction by-products, produced water, etc.

In this fuel cell system, a fuel of a predetermined concentration in a fuel tank 12 and the collected liquid in the gas-liquid separator 1 are supplied into a mixing tank 15 at predetermined flow rates by using a liquid supply pump 14 and a liquid supply pump 13, respectively. The dilute fuel homogeneously mixed in the mixing tank 15 (fuel mixture) is directly supplied to the anode 17 of the fuel cell 11 through a fuel supply path 20 by using a liquid supply pump 16. The amount of the fuel supplied to the anode 17 is preferably set to 1.1 to 2.2 times the amount consumed by power generation.

Subsequently, by using an air pump 18, air is supplied to the cathode 19 of the fuel cell 11 through an oxidant supply path 21 to start power generation of the fuel cell 11. All the effluents (gas and liquid components) from the anode 17 and the cathode 19 of the fuel cell 11 as a result of power generation are introduced into the gas-liquid separator 1, where unreacted fuel and reaction by-products are catalytically purified and water is collected. Carbon dioxide produced by power generation and catalytic purification is released into the atmosphere together with air.

Referring now to FIG. 2, the structure of the gas-liquid separator 1, which is a characteristic of the fuel cell system of the present invention, is described.

The gas-liquid separator 1 catalytically purifies harmful substances in gas and liquid components discharged from the fuel cell and collects water. In the present invention, the gas-liquid separator 1 preferably has a condenser for condensing the effluents. This condenser has a catalytic purification function, and the condenser controls the concentration of the fuel contained in the collected liquid.

The gas-liquid separator 1 having the catalytic purification function can be composed of, for example, a housing 2 with an open top and a condenser 1a. Since the gas-liquid separator has the condenser, variations in the concentration of the fuel in the liquid collected by the gas-liquid separator can be reduced. As a result, the concentration of the fuel directly supplied to the fuel cell can be controlled constant, so that degradation of power generation stability caused by fuel concentration variations can be suppressed.

As illustrated in FIG. 2, the condenser 1a preferably has an upper laminate (first condenser) 7 and a lower laminate (second condenser) 8, with a space (gas-liquid separation chamber 3) interposed between the upper laminate 7 and the lower laminate 8. That is, a second housing 2b, which is open on both ends thereof, is preferably disposed between the upper laminate 7 and the lower laminate 8 so that the upper laminate 7 is opposed to the lower laminate 8 with the space interposed therebetween.

The upper laminate 7 includes a first catalyst layer 5a, a pair of first porous layers 6a sandwiching the first catalyst layer 5a, and a pair of gas-liquid separating membranes 4 sandwiching the first porous layers 6a. Also, the lower laminate 8 includes a second catalyst layer 5b and a pair of second porous layers 6b sandwiching the second catalyst layer 5b.

Further, between the housing 2 and the gas-liquid separation chamber 3 is a water absorber 10, which absorbs the water contained in the effluents (i.e., water produced by catalytic combustion reaction, etc.) and transports it into a water reservoir 9 on the bottom of the housing 2 in a more reliable manner.

The effluents from the anode 17 and the cathode 19 are introduced into the gas-liquid separation chamber 3 from side faces of the gas-liquid separator 1. Of the effluents, gas components pass through the gas-liquid separating membrane 4, the first porous layer 6a, and the first catalyst layer 5a sequentially (the direction shown by the arrow X), so that they are catalytically purified. Water produced by the reaction is transported through the water absorber 10 into the water reservoir 9. Also, carbon dioxide produced by power generation and catalytic purification further passes through the first porous layer 6a and the gas-liquid separating membrane 4 sequentially, and is released into the atmosphere from an opening 2a together with air.

Of the effluents, liquid components pass through the second porous layer 6b and the second catalyst layer 5b (the direction shown by the arrow Y), so that they are catalytically purified. Water produced by power generation and catalytic purification is transported through the second porous layer 6b and the water absorber 10 into the water reservoir 9.

That is, the gas components discharged from the fuel cell pass through the first gas-liquid separating membrane of the upper laminate, diffuse through the first porous layer, and are evenly supplied to the first catalyst layer. In the first catalyst layer, the unreacted fuel and reaction by-products in the gas components are catalytically purified, so that water is collected. The carbon dioxide produced by power generation and catalytic purification is promptly released into the atmosphere together with air. The liquid components diffuse through the second porous layer of the lower laminate and are evenly supplied to the second catalyst layer. In the second catalyst layer, the unreacted fuel and reaction by-products in the liquid components are catalytically purified, so that water is collected. Hence, since the condenser has the upper laminate including the first catalyst layer, the first porous layers, and the gas-liquid separating membranes and the lower laminate including the second porous layers and the second catalyst layer, it is possible to secure water necessary for power generation without releasing harmful substances to outside.

In the fuel cell system of the present invention, the water absorber is preferably disposed around the condenser, as illustrated in FIG. 2. With this structure, water produced by catalytic purification can be absorbed and promptly transported into the water reservoir in the gas-liquid separator. It is thus possible to secure water necessary for power generation while suppressing a decrease in catalytic purification rate due to accumulation of water.

Further, the concentration of the fuel contained in the liquid collected by the gas-liquid separator is preferably controlled at 0.1 mol/L or less. In this way, by adjusting the concentration of the fuel contained in the collected liquid, variations in the concentration of the fuel directly supplied to the fuel cell are dramatically reduced, so that it is possible to provide a fuel cell system with excellent power generation stability. In particular, by operating the fuel cell system of the present invention such that the amount of fuel supply is as close to the amount consumed by power generation as possible, it is possible to significantly reduce the amount of unreacted fuel and reaction by-products contained in the effluent introduced from the anode into the gas-liquid separator. It is thus possible to control the concentration of the fuel in the collected liquid at 0.1 mol/L or less.

The gas-liquid separating membrane 4 can be, for example, a water-repellent porous sheet made of fluorocarbon resin such as polytetrafluoroethylene (PTFE).

The catalyst contained in the first catalyst layer 5a and the second catalyst layer 5b is preferably a catalyst containing platinum or a platinum alloy. For example, when the catalyst contains platinum, the catalyst may be composed only of platinum or may contain platinum and at least one metal selected from the group consisting of platinum-group metals (ruthenium, rhodium, palladium, osmium, and iridium), cobalt, iron, titanium, gold, silver, chromium, manganese, molybdenum, tungsten, aluminum, silicon, rhenium, zinc, and tin.

An example of platinum alloys is an alloy of platinum and at least one metal selected from the group consisting of platinum-group metals other than platinum (ruthenium, rhodium, palladium, osmium, and iridium), cobalt, iron, titanium, gold, silver, chromium, manganese, molybdenum, tungsten, aluminum, silicon, rhenium, zinc, and tin.

The catalyst of the first catalyst layer 5a and the catalyst of the second catalyst layer 5b may be the same or different.

The first porous layers 6a and the second porous layers 6b may be made of any material if it can support the first catalyst layer 5a and the second catalyst layer 5b while allowing the effluents (gas and liquid components) from the fuel cell 11 to diffuse therethrough. The first porous layers and the second porous layers may be made of, for example, a porous carbon material such as carbon cloth or carbon paper.

The first porous layers 6a and the second porous layers 6b may be made of the same material or different materials.

The water absorber 10 may be made of any material if it can absorb water and promptly transport it into the water reservoir 9. The water absorber 10 can be formed of, for example, a capillary resin material such as cotton. In order to transport water toward the water reservoir 9 in a more reliable and efficient manner, the water absorber 10 is preferably mounted in the direction from the opening 2a of the housing 2 toward the water reservoir 9, i.e., substantially parallel to the direction of the arrows X and Y.

In the gas-liquid separator 1 with the above-described structure, the first catalyst layer 5a and the second catalyst layer 5b can be prepared, for example, as follows. The first catalyst layer 5a and the second catalyst layer 5b can be formed by using an ink for forming the first catalyst layer and an ink for forming the second catalyst layer, respectively. The ink for forming the first catalyst layer and the ink for forming the second catalyst layer can be prepared by mixing a catalyst and a dispersion medium in such a ratio that the functions of the first catalyst layer 5a and the second catalyst layer 5b can be obtained. The dispersion medium used in these catalyst inks preferably contains at least one selected from the group consisting of water, methanol, ethanol, propanol, n-butyl alcohol, isobutyl alcohol, sec-butyl alcohol, and tert-butyl alcohol. These water and alcohols can be used singly or in combination of two or more of them.

In forming the first catalyst layer 5a or the second catalyst layer 5b by using the catalyst ink, the catalyst ink may be directly applied onto the first porous layer 6a or the second porous layer 6b to form a catalyst layer (direct application method). Alternatively, the catalyst ink may be applied onto a substrate to form a catalyst layer and the catalyst layer may be transferred on the first porous layer 6a or the second porous layer 6b (indirect application method).

Examples of application methods of the catalyst ink include screen printing, die coating, spraying, and ink jet printing.

An example of indirect application methods is as follows: the first catalyst layer 5a or the second catalyst layer 5b is formed on a substrate made of polypropylene or polyethylene terephthalate by the above-mentioned application method and is heat transferred onto the first porous layer 6a or the second porous layer 6b.

The upper laminate 7 can be prepared by bonding the first catalyst layer 5a thus formed, a pair of the first porous layers 6a sandwiching the first catalyst layer 5a, and a pair of the gas-liquid separating membranes 4 sandwiching the first porous layers 6a, for example, with adhesive or hot pressing.

The lower laminate 8 can be prepared by bonding the second catalyst layer 5b thus formed and a pair of the second porous layers 6a sandwiching the second catalyst layer 5b, for example, with adhesive or hot pressing.

In the fuel cell system of the present invention, the fuel and the collected liquid are preferably supplied to the anode-side flow channel. For example, as illustrated in FIG. 1, a fuel mixture of the fuel from the fuel tank and the collected liquid from the gas-liquid separator is preferably supplied to the fuel cell. In this case, the concentration of the fuel directly supplied to the fuel cell can be adjusted by adjusting the amount of the fuel supplied from the fuel tank and the amount of the collected liquid supplied from the gas-liquid separator, without requiring feed back control by, for example, a fuel concentration detection sensor.

Figure 3:
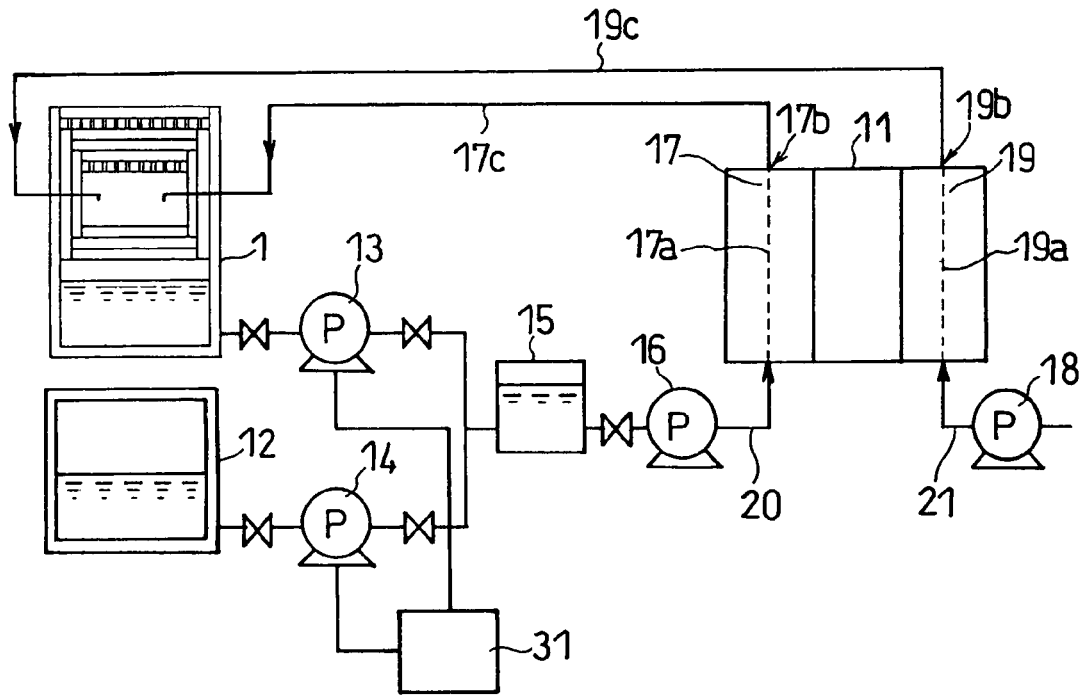
FIG. 3 is a schematic view of the structure of a fuel cell system according to another embodiment of the present invention.

Referring now to FIG. 3, the fuel cell system having a flow rate controller is described.

The fuel cell system of FIG. 3 is the same as the fuel cell system of FIG. 1 except that it has a flow rate controller 31. The flow rate controller 31 controls the concentration of the fuel supplied to the anode by controlling the ratio of the flow rate of the fuel supplied to the anode-side flow channel per unit time to the flow rate of the liquid collected by the gas-liquid separator supplied to the anode-side flow channel per unit time.

The flow rate controller 31 is connected to the liquid supply pumps 13 and 14 and controls the operation of these pumps to adjust the flow rates of the collected liquid and the fuel. In this way, due to the use of the flow rate controller 31, the ratio of the flow rate of the fuel per unit time to the flow rate of the collected liquid per unit time can be controlled constant. It is thus possible to precisely adjust the amount of the fuel supplied from the fuel tank to the fuel cell.

For example, when the flow rate controller is connected to the liquid supply pumps, the flow rate controller is not particularly limited as long as it can control the flow rates of the liquid supply pumps. The flow rate controller can be, for example, an electronic circuit.

Figure 4:
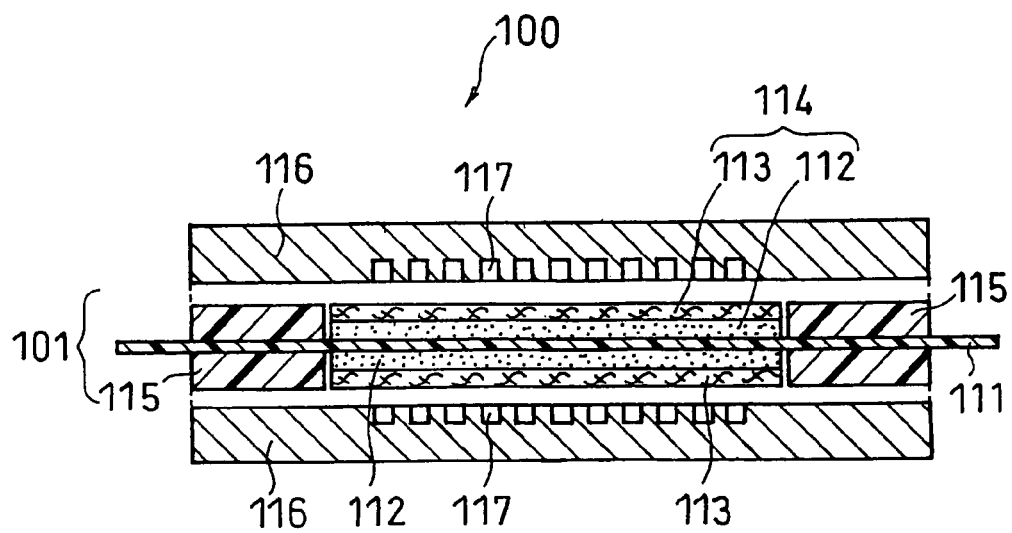
FIG. 4 is a schematic cross-sectional view of the structure of a unit cell of a fuel cell included in the fuel cell system of FIG. 1.

Next, the fuel cell 11 included in the fuel cell system of the present invention is hereinafter described. The fuel cell 11 includes at least one unit cell including a membrane electrode assembly (MEA) containing a proton (hydrogen ion) conductive polymer electrolyte and a pair of separators sandwiching the membrane electrode assembly. FIG. 4 is a schematic cross-sectional view of an exemplary basic structure of a unit cell that can be used in the fuel cell 11 included in the fuel cell system of the present invention. As illustrated in FIG. 4, a unit cell 100 includes a membrane electrode assembly 101 and a pair of separators 116 sandwiching the membrane electrode assembly 101.

As illustrated in FIG. 4, in the membrane electrode assembly 101, a catalyst layer 112 is formed on each side of a polymer electrolyte membrane 111 which selectively transports hydrogen ions. This is called a membrane catalyst layer assembly. The catalyst layer 112 contains an electrode catalyst prepared by placing a catalyst (e.g., platinum-group metal catalyst) on a carbon powder and a hydrogen-ion conductive polymer electrolyte. The polymer electrolyte membrane 111 is typically a perfluorocarbon sulfonic acid polymer electrolyte membrane (e.g., Nafion (trade name) available from E.I. Dupont de Nemours and Company of USA).

A gas diffusion layer 113 having both gas permeability and electronic conductivity is formed on the outer side of each catalyst layer 112 by using, for example, carbon paper or carbon cloth subjected to a water-repellent treatment. The catalyst layer 112 and the gas diffusion layer 113 combine to form a gas diffusion electrode (anode or cathode) 114. The unit cell 100 is composed of the membrane electrode assembly 101, gaskets 115, and the pair of separators 116.

The gaskets 115 are fitted around the gas diffusion electrodes so as to sandwich the polymer electrolyte membrane, in order to prevent supplied fuel and oxidant gases from leaking out or mixing together. These gaskets are integrally combined with the gas diffusion electrodes and the polymer electrolyte membrane in advance. It is noted that the assembly of the gas diffusion electrodes, polymer electrolyte membrane, and gaskets may be referred to as the membrane electrode assembly.

The membrane electrode assembly 101 is sandwiched between the pair of separators 116 in order to mechanically fix the membrane electrode assembly 101. These separators 116 have flow channels (anode-side flow channel and cathode-side flow channel) 117 at their positions in contact with the membrane electrode assembly 101. Through these flow channels, a fuel and an oxidant are supplied to the gas diffusion electrodes (anode and cathode) 114, respectively, and reaction products and unreacted fuel are discharged from the electrode reaction sites to the outside of the electrodes.

As described above, the membrane electrode assembly 101 is fixed by the two separators 116, and power can be generated by supplying a fuel to the flow channel 117 of one of the separators 116 and an oxidant to the flow channel 117 of the other separator 116. If necessary, a necessary number of unit cells 100 may be connected in series or in parallel to form the fuel cell 11 of FIG. 1.

It should be noted that the above-described representative embodiments of the fuel cell system of the present invention are not to be construed as limiting the present invention. For example, the structure of the fuel cell is not limited to the above embodiments, and various design changes are possible.

The fuel cell system of the present invention can directly utilize methanol, dimethyl ether, or the like as the fuel without reforming it into hydrogen, and is useful, for example, as the power source for portable electronic devices, such as cellular phones, personal digital assistants (PDA), notebook PCs, and video cameras. Further, the fuel cell system of the present invention is also applicable to power sources for electric scooters, automobiles, etc.

Although the present invention has been described in terms of the presently preferred embodiments, it is to be understood that such disclosure is not to be interpreted as limiting. Various alterations and modifications will no doubt become apparent to those skilled in the art to which the present inven-

The invention claimed is:

1. A fuel cell system comprising:
   a fuel cell including at least one unit cell comprising an anode, an anode-side flow channel for supplying a fuel to said anode, a cathode, and a cathode-side flow channel for supplying an oxidant to said cathode;
   a fuel supply path and an oxidant supply path for supplying said fuel and said oxidant to said anode-side flow channel and said cathode-side flow channel, respectively;
   an anode-side discharge path and a cathode-side discharge path for discharging an effluent from said anode and an effluent from said cathode, respectively, said anode-side discharge path and said cathode-side discharge path being in fluid communication with a fuel outlet of said anode-side flow channel and an oxidant outlet of said cathode-side flow channel, respectively; and
   a gas-liquid separator for catalytically purifying said effluent from said anode and said effluent from said cathode in order to collect liquid, said gas-liquid separator being connected to said anode-side discharge path and said cathode-side discharge path.

2. The fuel cell system in accordance with claim 1, wherein said gas-liquid separator has a condenser for condensing said effluents, and said condenser controls the concentration of said fuel contained in said liquid collected by said gas-liquid separator.

3. The fuel cell system in accordance with claim 2, wherein the concentration of said fuel contained in said liquid collected by said gas-liquid separator is controlled at 0.1 mol/L or less.

4. The fuel cell system in accordance with claim 2,
   wherein said condenser includes an upper laminate and a lower laminate,
   said upper laminate includes a first catalyst layer, a first porous layer, and a gas-liquid separating membrane,
   said lower laminate includes a second porous layer and a second catalyst layer, and
   said effluents from said anode and said cathode are passed through said upper laminate and said lower laminate in order to catalytically purify said effluents to collect liquid.

5. The fuel cell system in accordance with claim 4, wherein said condenser has a water absorber.

6. The fuel cell system in accordance with claim 1, wherein said fuel and said liquid collected by said gas-liquid separator are supplied to said anode-side flow channel.

7. The fuel cell system in accordance with claim 6, further comprising a flow rate controller which controls the concentration of said fuel supplied to said anode by controlling the ratio of the flow rate of said fuel supplied to said anode-side flow channel per unit time to the flow rate of said liquid collected by said gas-liquid separator supplied to said anode-side flow channel per unit time.

* * * * *